(12) United States Patent
Trostle

(10) Patent No.: US 6,718,467 B1
(45) Date of Patent: Apr. 6, 2004

(54) PASSWORD BASED PROTOCOL FOR SECURE COMMUNICATIONS

(75) Inventor: Jonathan T. Trostle, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/429,526

(22) Filed: Oct. 28, 1999

(51) Int. Cl.[7] .................................................. H04L 9/00
(52) U.S. Cl. ..................... 713/171; 713/168; 713/169; 713/202; 713/184; 380/281; 380/284
(58) Field of Search ............................... 713/168, 169, 713/170, 171, 184, 201; 380/30, 45, 278, 281, 282–285

(56) References Cited

U.S. PATENT DOCUMENTS

| | | | |
|---|---|---|---|
| 5,163,147 A | | 11/1992 | Orita ............................ 395/600 |
| 5,241,594 A | | 8/1993 | Kung ............................... 380/4 |
| 5,241,599 A | | 8/1993 | Bellovin et al. ................ 380/21 |
| 5,351,136 A | | 9/1994 | Wu et al. ...................... 358/440 |
| 5,421,006 A | | 5/1995 | Jablon et al. ................. 395/575 |
| 5,491,749 A | * | 2/1996 | Rogaway ...................... 713/171 |
| 5,502,765 A | * | 3/1996 | Ishiguro et al. ................ 705/67 |
| 5,590,199 A | * | 12/1996 | Krajewski et al. ........... 713/159 |
| 5,655,077 A | | 8/1997 | Jones et al. ............. 395/187.01 |
| 5,671,354 A | | 9/1997 | Ito et al. ................. 395/187.01 |
| 5,680,461 A | | 10/1997 | McManis ....................... 380/25 |
| 5,684,950 A | | 11/1997 | Dare et al. ............. 395/187.01 |
| 5,708,780 A | | 1/1998 | Levergood et al. ..... 395/200.12 |
| 5,764,772 A | | 6/1998 | Kaufman et al. .............. 380/30 |
| 5,815,665 A | | 9/1998 | Teper et al. ........... 395/200.59 |
| 5,835,727 A | | 11/1998 | Wong et al. ........... 395/200.68 |
| 5,845,070 A | | 12/1998 | Ikudome ................ 395/187.01 |
| 5,898,780 A | | 4/1999 | Liu et al. ....................... 380/25 |
| 5,919,257 A | * | 7/1999 | Trostle ....................... 713/200 |
| 5,944,824 A | | 8/1999 | He ............................... 713/201 |
| 5,958,016 A | | 9/1999 | Chang et al. ................ 709/229 |

(List continued on next page.)

FOREIGN PATENT DOCUMENTS

WO    99/53408    10/1999    ........... G06F/15/16

OTHER PUBLICATIONS

"Access Control Product Information", Ascend Communications, Inc., 4 pages.

(List continued on next page.)

*Primary Examiner*—Ayaz Sheikh
*Assistant Examiner*—Kambiz Zand
(74) *Attorney, Agent, or Firm*—Thelen Reid & Priest, LLP; John P. Schaub (57) ABSTRACT

A method for a first participant to establish a shared secret with a second participant, where the first participant and the second participant share a password-based first master key and a hash function includes sending a first message including a first private value for the second participant and a first authenticator for the second participant encrypted with the first master key. The first message also includes a first hashed authenticator for the first participant encrypted with a first shared secret key. The first message also includes a first public value for the first participant. The first participant receives a second message, the second message including the first authenticator for the second participant and a first public value for the second participant encrypted with the first shared secret key. The first participant sends a third message, the third message including the first authenticator for the first participant, a second hashed authenticator for the first participant, a second authenticator for the second participant and a second master key encrypted with a second shared secret key. The third message also includes a second public value for the first participant. A fourth message is received by the first participant, the fourth message including a second authenticator for the second participant and a second public value for the second participant encrypted with the second shared secret key.

93 Claims, 2 Drawing Sheets

U.S. PATENT DOCUMENTS

| | | | | |
|---|---|---|---|---|
| 5,987,232 | A | 11/1999 | Tabuki | 395/187.01 |
| 5,991,810 | A | 11/1999 | Shapiro et al. | 709/229 |
| 6,006,334 | A | 12/1999 | Nguyen et al. | 713/202 |
| 6,011,910 | A | 1/2000 | Chau et al. | 395/200.59 |
| 6,021,496 | A | 2/2000 | Dutcher et al. | 713/202 |
| 6,044,155 | A | 3/2000 | Thomlinson et al. | 380/49 |
| 6,047,376 | A | 4/2000 | Hosoe | 713/201 |
| 6,092,196 | A | 7/2000 | Reiche | 713/200 |
| 6,141,687 | A | 10/2000 | Blair | 709/225 |
| 6,230,272 | B1 * | 5/2001 | Lockhart et al. | 713/202 |

OTHER PUBLICATIONS

"Active Software's Integration System", Active Software, Inc., printed from http://www.activesw.com/products/products.html, on Jul. 24, 1998.

Cisco User Control Point, pp. 1–4, printed from http://www.cisco.com/warp.public/728/ucp/ucp ds.htm om Sep. 10, 1998.

IPSec Network Security, pp. 1–69, printed from http://www.cisco.com/univercd/cc/td/doc/products/software/ios113ed/113t/113t 3/ipsec.

Patel, B., et al., "Securing L2TP using IPSEC", May 1998, PPPEXT Working Group, pp. 1–10, printed from http://www.masinter.net/~12tp/ftp/draft–ietf–pppext–12tp–security–02.txt.on Sep. 21, 1998.

"Remote Access Network Security", Ascend Communications, Inc., printed from http://www.ascend.com/1103.html, on Jul. 24, 1998, pp. 1–8.

Rigney, et al., "Remote Authentication Dial In User Service (RADIUS)", Network Working Group, RFC 2138, Apr. 1997, pp. 1–57.

Bellare et al., "Keying Hash Functions for Message Authentication", 1996, Advances in Cryptology–Crypto 96 Proceedings, Lecture Notes in Computer Science, vol. 1109, N. Koblitz ed., Springer–Verlag.

Bellovin, Steven M., "Problem Areas for the IP Security Protocols", Jul. 22–25, 1996, Proceedings of the Sixth Usenix UNIX Security Symposium, San Jose, CA.

Krawczyk, Hugo, "SKEME: A Versatile Secure Key Exchange Mechanism for Internet", 1996, IEEE, Proceedings of the 1996 Symposium on Network and Distributed Systems Security.

* cited by examiner

PASSWORD BASED PROTOCOL FOR SECURE COMMUNICATIONS

BACKGROUND OF THE INVENTION

1. Field of the Invention

The present invention relates to computer science. More particularly, the present invention relates a password-based protocol for secure communications.

2. Background

Computer security is an important consideration in modern computer systems. With advances in technology and new paradigms, enhanced security is becoming a priority, particularly with the growing interest in e-commerce. This concern has led to the use of cryptography to establish authenticated and/or private communications between parties who initially share only a relatively insecure secret.

Cryptography involves the design of algorithms for encryption and decryption, to ensure the secrecy and/or authenticity of messages. Encryption is the conversion of data (called plaintext) into an unintelligible form (called ciphertext) by means of a reversible translation, based on a translation table or algorithm. Decryption is the translation of ciphertext into plaintext. Typically, cryptographic functions require "keys" which are used to encrypt and decrypt the data and are known only by trusted entities.

There are two commonly known types of key-based cryptography, known as symmetric key and asymmetric key. Symmetric key cryptography uses the same key to encrypt and decrypt data while asymmetric key cryptography uses two keys which are mutual inverses (one decrypts the other's encryption). Asymmetric key cryptography is also known as 'public key' cryptography because one half of a pair of keys can be published without compromising the overall security of the system.

Public key technology is has some cryptographic and scaling advantages over symmetric key techniques. For example, public keys can be more easily published without compromising the security of the private key or the overall system. However, public key technology suffers from some problems that are similar to those experienced by well-known symmetric key systems such as Kerberos, Sesame and standard Unix login security. One problem is that of key management, where keys must be generated and passed around through the system. The problem is slightly different in symmetric systems and public key systems. Key negotiation is required in symmetric systems so that the secrecy of keys is maintained, while in public key systems, broadcast of public keys and establishing trust in the public key is the main requirement. Symmetric key systems use trusted third parties, typically called Key Distribution Centers (as in Kerberos), to manage this process and an analogous technique can be used in public key systems.

Moreover, public key systems suffer from additional problems. Many corporate environments are unsuitable for the deployment of public key systems because the infrastructure for widespread use of such systems does not exist. Accepted standards and software tools to support those standards are not in place. The absence of such an infrastructure for public key systems, in addition to other problems, prevents the widespread use of public key systems.

An important goal in security design is to limit the harm caused by the exposure of keys. This is especially important for long-lived keys. If the compromise of a single key exposes to the attacker all the traffic exchanged by a party during a relatively long time period, such a key becomes an attractive target for an adversary, and a major bottleneck for system security. An improvement is made possible by limiting the advantage for the attacker that breaks the key only to future active impersonation attacks, where the potential of being detected is high. A key exchange mechanism that protects short-lived keys from compromise even in the case of exposure of long-lived keys, is said to provide perfect forward secrecy (PFS). In a system that provides PFS, keys actually used to encrypt traffic are periodically changed such that prior traffic keys cannot be recovered (and prior encrypted traffic cannot be decrypted) even when the attacker has a complete recording of all traffic and a complete readout of the "current machine state" for both parties. "Current machine state" includes all long-lived secret keys, but does not include any state that was destroyed at the last key change.

For example, if all session keys exchanged by a party C are encrypted under C's public key, then an attacker that breaks the private key of C would also learn all past, and even future, session keys of C. In contrast, by using the Diffie-Hellman algorithm for key exchange and C's private key only to sign this exchange, a much better level of security is achieved. In that case, the attacker that compromises the private key will be able to actively impersonate C in future communications, but will learn nothing about past communications, or even future ones in which the attacker is not actively involved.

Another important goal in security design is authentication. Authentication is a technique by which a process verifies that its communication partner is who it is supposed to be and not an imposter. In mutual authentication, both communication partners verify the identity of the other. In a typical authentication protocol, a first party sends a random number to the a second party, who then transforms it in a special way using key shared only by the two parties and then returns the result. If the returned result is as expected, the first party is assured that the message came from the second party because no other party knew the shared key. Such protocol is called a challenge-response protocol.

Accordingly, a need exists in the prior art for a method and apparatus for a relatively secure communications protocol that provides mutual authentication, key establishment and perfect forward secrecy. A further need exists for such a method and apparatus in an environment unsuitable for full deployment of public key cryptographic solutions.

BRIEF DESCRIPTION OF THE INVENTION

A method for a first participant to establish a shared secret with a second participant, where the first participant and the second participant share a password-based first master key and a hash function includes sending a first message including a first private value for the second participant and a first authenticator for the second participant encrypted with the first master key. The first message also includes a first hashed authenticator for the first participant encrypted with a first shared secret key. The first message also includes a first public value for the first participant. The first participant receives a second message, the second message including the first authenticator for the second participant and a first public value for the second participant encrypted with the first shared secret key. The first participant sends a third message, the third message including the first authenticator for the first participant, a second hashed authenticator for the first participant, a second authenticator for the second participant and a second master key encrypted with a second shared secret key. The third message also includes a second public value for the first participant. A fourth message is received by the first participant, the fourth message including a second authenticator for the second participant and a second public value for the second participant encrypted with the second shared secret key.

DETAILED DESCRIPTION OF THE PREFERRED EMBODIMENTS

Those of ordinary skill in the art will realize that the following description of the present invention is illustrative only. Other embodiments of the invention will readily suggest themselves to such skilled persons having the benefit of this disclosure.

This invention relates to computer science. More particularly, the present invention relates to a password-based protocol for secure communications. The invention further relates to machine readable media on which are stored (1) the layout parameters of the present invention and/or (2) program instructions for using the present invention in performing operations on a computer. Such media includes by way of example magnetic tape, magnetic disks, optically readable media such as CD ROMs and semiconductor memory such as PCMCIA cards. The medium may also take the form of a portable item such as a small disk, diskette or cassette. The medium may also take the form of a larger or immobile item such as a hard disk drive or a computer RAM.

According to the present invention, a mechanism for establishing private and authenticated communications between parties who share only a relatively insecure secret is provided. The communications conducted according to the present invention provide mutual authentication and perfect forward secrecy.

The notation used throughout is presented in Table 1.

TABLE 1

| Item | Description |
| --- | --- |
| C, S | The parties desiring to communicate. |
| Cid | An identifier for C. |
| Sid | An identifier for S. |
| p | A prime number shared by C and S. |
| g | A primitive root of p shared by C and S. |
| DHkey$_n$ | A Diffie-Hellman shared key. |
| X$_n$ | Diffie-Hellman public value used by S to calculate DHkey$_n$. |
| Y$_n$ | Diffie-Hellman public value used by C to calculate DHkey$_n$. |
| x$_n$ | Diffie-Hellman private value used by S to calculate DHkey$_n$. |
| y$_n$ | Diffie-Hellman private value used by C to calculate DHkey$_n$. |
| c, c', c" | Random values used by S to authenticate C. |
| s, s', s" | Random values used by C to authenticate S. |

TABLE 1-continued

| Item | Description |
| --- | --- |
| P, P' | Passwords. |
| k(P) | An encryption key for a symmetric key encryption system derived from P. |
| h | A one-way hash function. |
| K | A symmetric encryption key shared by C and S, K = h(k(P)). |
| [A, B]D | The encryption of strings "A" and "B" with key "D". |

According to one embodiment of the present invention, "Diffie-Hellman" keys are used as shared private keys. Such keys are described in M. E. Hellman, W. Diffie and R. C. Merkle, U.S. Pat. No. 4,200,770, Apr. 29, 1980, and in W. Diffie and M. E. Hellman, "New Directions in Cryptography, I.E.E.E. Transactions on Info. Theory, Vol. 22, No. 6 (November 1976). To aid in a better understanding of the present invention, an overview of the Diffie-Hellman algorithm will now be presented.

The purpose of the Diffie-Hellman algorithm is to enable two users to exchange a key securely that can be used for subsequent encryption of messages. The algorithm itself is limited to the exchange of keys. In Diffie-Hellman key exchange, there are two publicly known numbers: a prime number p and an integer g that is a primitive root of p. When users C and S want to exchange a key, user C selects a random integer x and computes $X = g^x \mod p$. Similarly, user S independently selects a random integer y and computes $Y = g^y \mod p$. C and S keep secret x and y, respectively. C transmits X to S in the clear, and S transmits Y to C in the clear. User C computes $K = Y^x \mod p$ and user S computes $K = X^y \mod p$. Both calculations produce identical results. The value K can then be used as the key in further communications between C and S. An attacker, knowing only X and Y, cannot perform the same calculation. An attacker can, however, still carry out a "Man in the middle" attack on this exchange.

Figure 1:
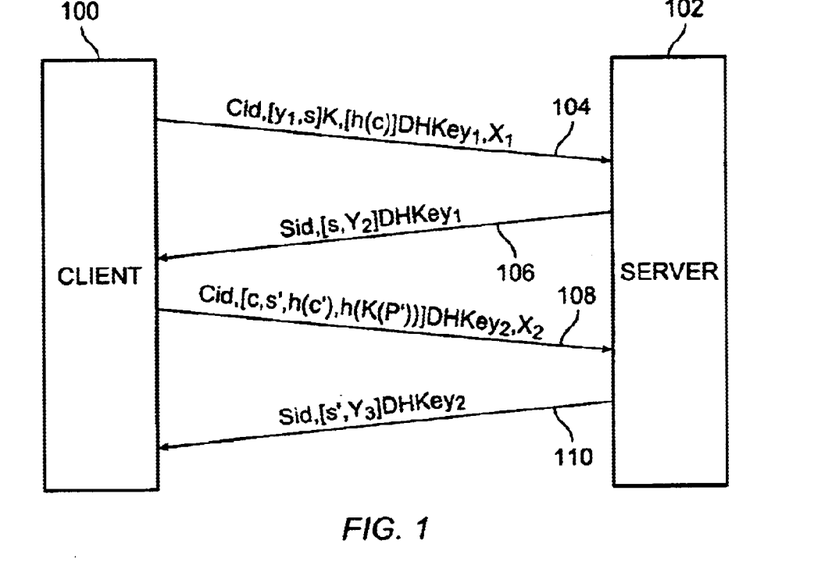
FIG. 1 is a block diagram that illustrates a method for establishing a shared secret between a first participant and a second participant in accordance with one embodiment of the present invention.

The messages exchanged in an illustrative embodiment of the invention are presented in FIG. 1. In FIG. 1, there are two participants, called Client (C) 100 and Server (S) 102 that desire to establish private and authenticated communications over a channel. C 100 is the calling party and S 102 is the called party. The messages shown may be conveyed by public or private communications paths, e.g. network links. In this embodiment, and in each embodiment in the detailed description, C 100 and S 102 are deemed, prior to the beginning of the message exchange, to share knowledge of the secret password (P), a one-way hash function (h), an encryption key (k(P)) and another key K such that K=h(k (P)). C 100 and S 102 are also deemed to share knowledge of a prime number (p) and a primitive root of p (g).

Figure 2:
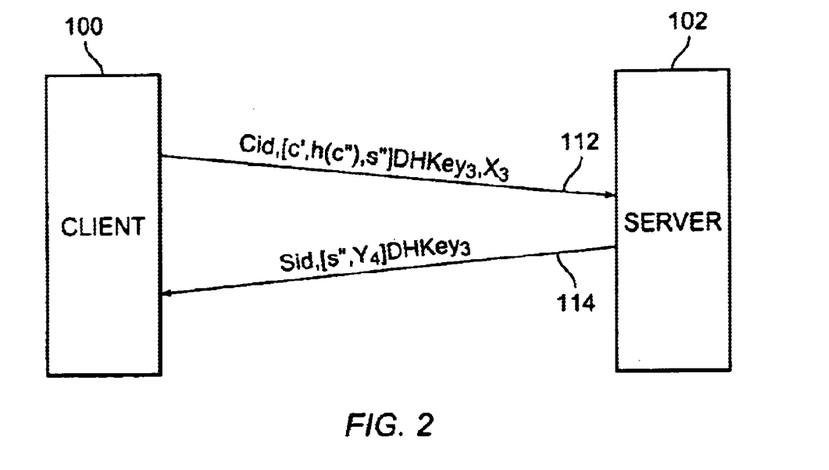
FIG. 2 is a block diagram that illustrates a method for generating a new a shared secret between a first participant and a second participant in accordance with one embodiment of the present invention.

As illustrated in FIGS. 1 and 2, the message exchange between C 100 and S 102 may be separated into three stages: The "Setup Initial State" stage, represented by messages 104 and 106, the "Generate New Password" stage, represented by messages 108 and 110 and the "Normal Exchange" stage, represented by messages 112 and 114. In the first stage, C 100 and S 102 establish a stored state in preparation for subsequent message exchanges. In the second stage, the master password is changed to thwart a possible password chaining attack. A normal exchange between C 100 and S 102 occurs in the third stage. In a normal exchange, C and S exchange authenticated messages which may be encrypted with a new shared private key.

A stored state for each participant is maintained in each of the three stages. The stored state for each participant is represented in Table 2. As shown in Table 2, both C 100 and S 102 store the current shared private key. C 100 stores its private value c for use in authenticating to S 102. C 100 also stores the current public value for S 102 ($Y_n$) Similarly, S 102 stores the latest private value for S 102 ($y_n$), to be used to calculate the next shared private key.

TABLE 2

| C | S |
|---|---|
| $Y_n$ | $y_n$ |
| c | |
| $DHkey_n$ | $DHkey_n$ |

In order to facilitate a better understanding of the present invention, each of the three stages described above will now be discussed in more detail.

Setup Initial State

First, C 100 generates Diffie-Hellman parameters ($x_1$, $X_1$) and ($y_1$, $Y_1$). Unlike the classical Diffie-Hellman algorithm, C selects both $x_1$ and $y_1$ and then calculates $X_1$ and $Y_1$, where $Y_1 = g^{y_1}$ mod p $X_1 = g^{x_1}$ mod p The pair ($x_1$, $X_1$) represents the private and public Diffie-Hellman values for C 100, respectively. Similarly, the pair ($y_1$ $Y_1$) is used to denote the private and public Diffie-Hellman values for S 102.

C 100 also calculates shared key $DHkey_1$, where $DHkey_1 = Y_1^{x_1}$ mod p. The quantity $DHkey_1$ is used as a key in further communications between C 100 and S. Additionally, C 100 generates random values for authenticators c and s. C 100 sends $Cid, [y_1, s]K, [h(c)]DHkey_1, X_1$ (msg. 104)

to S 102 at reference numeral 104. The value "Cid" is an identifier for participant C 100. The value C 100 may be, for example, an IP (Internet Protocol) number. As shown above, both C 100 and $X_1$ are sent in the clear, while $y_1$ and s are encrypted with K and the hashed value of c is encrypted with $DHkey_1$.

According to one embodiment of the present invention, the SHA-1 cryptographic hash function is used for authentication and for creating a master key. Those of ordinary skill in the art will recognize that other cryptographic hash functions may be used as well.

Upon receiving message 104, S, uses K to decrypt [$y_1$, s]K, obtaining the values $y_1$ and s. S 102 then calculates $DHkey_1 = X_1^{y_1}$ mod p. S 102 uses $DHkey_1$ to decrypt [h(c)]$DHkey_1$ and obtain the hashed value of c, (h(c)). S 102 generates and stores Diffie-Hellman pair ($Y_2$, $Y_2$). At reference numeral TBD, S 102 sends $Sid, [s, Y_2]DHkey_1$ (msg. 106)

to C 100. The value "Sid" in message 106 is an identifier for S.

When C 100 receives message 106, C, it decrypts message 106 to obtain s and $Y_2$. C 100 uses s in message 106 to authenticate S. Specifically, C 100 compares the value of s sent in message 104 with the value of s decrypted in message 106. If the two values are the same, C 100 knows that S 102 sent the message, since only C 100 and S 102 know K. If the two values are not the same, message 106 may have been sent by an imposter, in which case the protocol is terminated.

Generate New Password

The initial exchange of messages 104 and 106 is vulnerable to a password chaining attack. This is because if an attacker correctly guesses K, he can obtain $y_1$ and use both $y_1$ and $X_1$ to generate $DHkey_1$. The attacker may then compare s in message 104 with s in message 106. If the two values are the same, the attacker knows he has obtained the correct $DHkey_1$ and can therefore decrypt subsequent messages. Therefore, according to the present invention, the master password is changed. If the principle is a user, the user is prompted to enter a new password (P'). If the principle is a process, the process generates its own new password. When C 100 has P', it computes and stores a new master key h(k(P')). Additionally, C 100 generates and stores random values c' and s' and Diffie-Hellman pair ($x_2$, $X_2$). C 100 also calculates $DHkey_2 = X_2^{y_2}$ mod p. C 100 then sends $Cid, [c, s', h(c'), h(k(P'))]DHkey_2, X_2$ (msg. 108)

to S 102 at reference numeral 108. In message 108, the value c is used to authenticate message 108 to S 102 and the value h(c') is used by C 100 to authenticate a future message.

Next, S 102 uses the value of $Y_2$ stored earlier and the value of $X_2$ sent in message 108 to calculate $DHkey_2 = X_2^{y_2}$ mod p. S 102 uses $DHkey_2$ to decrypt message 108, obtaining c, h(c') and h(k(P')). S 102 generates Diffie-Hellman pair ($y_3$, $Y_3$). S 102 stores $y_3$, $Y_3$ and h(k(P')). S 102 authenticates C 100 by computing h(c) and comparing it to the previous value of h(c). If the two values are the same, S 102 knows that C 100 sent the message. At reference numeral 110, S 102 sends $Sid, [s', Y_3]DHkey_2$ (msg. 110)

to C 100.

Upon receipt of message 110, C 100 uses $DHkey_2$ to decrypt the message, obtaining s' and $Y_3$. C 100 uses s' to authenticate S. C 100 stores $Y_3$.

Normal Exchange

After C authenticates message 110, C 100 and S 102 have an initial state. S 102 has h(c') to authenticate subsequent messages from C 100. Additionally, C 100 has $Y_3$ to use as a new Diffie-Hellman public value for S.

Subsequent exchanges between C 100 and S 102 are represented in FIG. 2. C 100 generates and stores s", c" and Diffie-Hellman pair ($x_3$, $X_3$). C 100 also computes and stores $DHkey_3 = Y_3^{x_3}$ mod p and then sends $Cid, [c', h(c"), s"]DHkey_3, X_3$ (msg. 112)

to S 102 at reference numeral 112.

Upon receipt of message 112, S 102 uses $X_3$, which was sent in the clear, and the stored value of $y_3$ to calculate $DHkey_3 = X_3^{y_3}$ mod p. S 102 uses $DHkey_3$ to decrypt message 112, obtaining c', h(c") and s". S 102 uses c' to validate C 100. Specifically, S 102 calculates h(c') and compares it to the value of h(c') stored previously. If the two values are the same, S 102 knows that C 100 sent the message. S 102 stores h(c"). S 102 completes a normal exchange by sending $Sid, [s", Y_4]DHkey_3$ (msg. 114)

to C 100 at reference numeral 114.

Upon receipt of message 114, C 100 uses s" to authenticate S 102. Once S 102 is authenticated, C 100 and S 102 may continue using shared private key $DHkey_3$ to encrypt messages.

Figure 3:
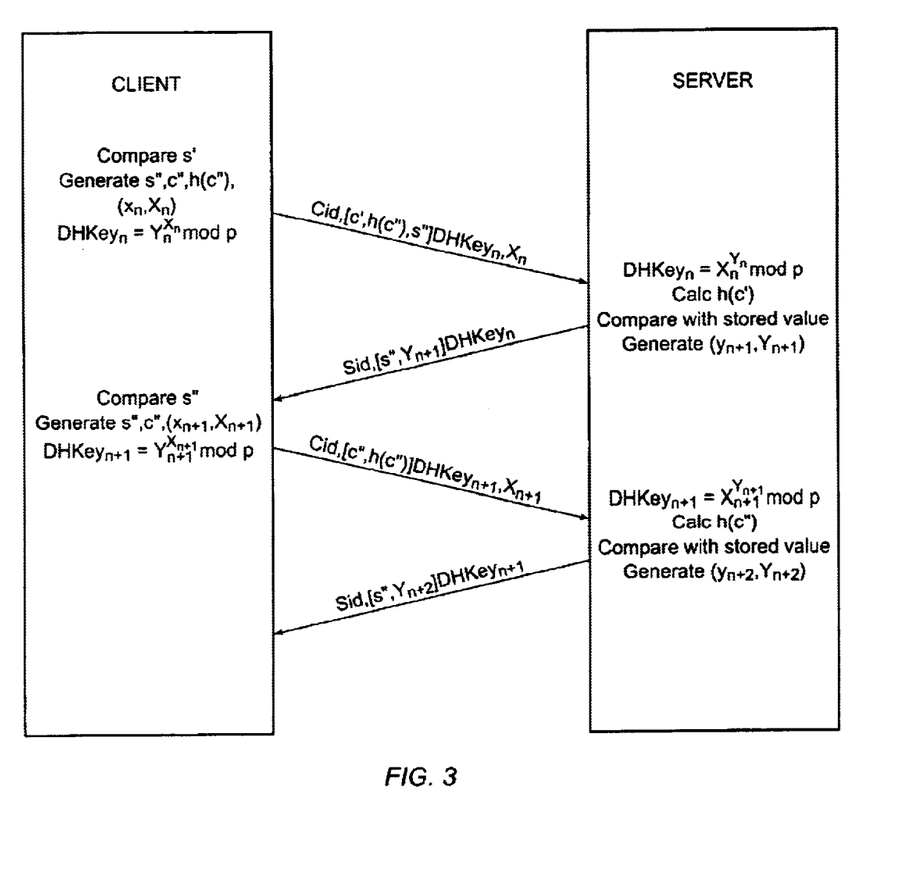
FIG. 3 is a block diagram that illustrates a generalized method for generating a shared secret between a first participant and a second participant in accordance with one embodiment of the present invention.

According to one embodiment of the present invention, messages 112 and 114 are repeated at predetermined intervals to ensure perfect forward secrecy. FIG. 3 is a block diagram that illustrates multiple normal exchanges after establishing an initial state.

Although the ephemeral value exchange scheme disclosed herein uses the constructions of classic Diffie-Hellman (exponentiation over finite fields), those of ordinary skill in the art will recognize that the invention is applicable to other key-agreement techniques, such as elliptic curve variants of Diffie-Hellman. To use these other variants, the messages may be modified to contain parameters specific to these other Diffie-Hellman variant schemes.

According to a presently preferred embodiment, the present invention may be implemented in software or firmware, as well as in programmable gate array devices, Application Specific Integrated Circuits (ASICs), and other hardware.

Thus, a novel method and apparatus for a relatively secure communications protocol that provides mutual authentication, key establishment and perfect forward secrecy in an environment unsuitable for full deployment of public key cryptographic solutions has been presented. While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for a first participant to establish a shared secret with a second participant, said first participant and said second participant sharing a password-based first master key and a hash function, the method for said first participant comprising:

sending a first message including a private value for said second participant and a first authenticator for said second participant encrypted with said first master key, said first message including a hash value of a first authenticator for said first participant encrypted with a first shared secret key, said first message including a first public value for said first participant;

receiving a second message in response to said sending said first message, said second message including said first authenticator for said second participant and a first public value for said second participant encrypted with said first shared secret key;

sending a third message in response to said receiving said second message, said third message including said first authenticator for said first participant, a hash value of a second authenticator for said first participant, a second authenticator for said second participant and a second master key encrypted with a second shared secret key, said third message including a second public value for said first participant; and receiving a fourth message in response to said sending said third message, said fourth message including a second authenticator for said second participant and a second public value for said second participant encrypted with said second shared secret key.

2. The method of claim 1, further comprising:

sending a fifth message to said second participant in response to said receiving said fourth message, said fifth message including said second authenticator for said first participant, a third authenticator for said second participant and a hash value of a third authenticator for said first participant encrypted with a third shared secret key, said fifth message including a third public value for said first participant; and receiving a sixth message from said second participant in response to said sending said fifth message, said sixth message including said third authenticator for said second participant and a third public value for said second participant encrypted with said third shared secret key.

3. The method of claim 2 wherein each of said authenticators is a random number;

each of said hash value of said first authenticator for said first participant, said hash value of said second authenticator for said first participant, and said hash value of said third authenticator for said first participant are created using a cryptographic hash function; and each of said first master key and said second master key are formed by encrypting at least part of a user password to obtain an encrypted password and inputting said encrypted password into said cryptographic hash function.

4. The method of claim 3 wherein said cryptographic hash function is SHA-1.

5. The method of claim 2 wherein said first message, said third message and said fifth message include an identifier for said first participant; and said second message, said fourth message and said sixth message include an identifier for said second participant.

6. The method of claim 5 wherein said identifier for said first participant comprises an IP address; and said identifier for said second participant comprises an IP address.

7. The method of claim 1 wherein said first public value for said first participant, said second public value for said first participant, said first public value for said second participant, said second public value for said second participant, and said private value for said second participant are Diffie-Hellman ephemeral parameters.

8. The method of claim 1 wherein said first public value for said first participant, said second public value for said first participant, said first public value for said second participant, said second public value for said second participant, and said private value for said second participant are Diffie-Hellman elliptic curve parameters.

9. The method of claim 7, further comprising:

authenticating said second message by comparing a stored value of said first authenticator for said second participant with the value of said first authenticator of said second participant in said second message;

authenticating said fourth message by comparing a stored value of said second authenticator for said second participant with the value of said second authenticator of said second participant in said fourth message; and authenticating said sixth message by comparing a stored third authenticator for said second participant with the value of said third authenticator of said second participant in said sixth message.

10. The method of claim 2, further comprising:

decrypting said second message by using said first shared secret key;

decrypting said fourth message by using said second shared secret key; and decrypting said sixth message by using said third shared secret key.

11. A method for a first participant to establish a shared secret with a second participant, said first participant and said second participant sharing a password-based first master key and a hash function, the method for said second participant comprising:

receiving a first message including a private value for said second participant and a first authenticator for said second participant encrypted with said first master key, said first message including a hash value of a first authenticator for said first participant encrypted with a first shared secret key, said first message including a first public value for said first participant;

sending a second message in response to said receiving said first message, said second message including said first authenticator for said second participant and a first public value for said second participant encrypted with said first shared secret key;

receiving a third message in response to said sending said second message, said third message including said first authenticator for said first participant, a hash value of a second authenticator for said first participant, a second authenticator for said second participant and a second master key encrypted with a second shared secret key, said third message including a second public value for said first participant; and sending a fourth message in response to said receiving said third message, said fourth message including a second authenticator for said second participant and a second public value for said second participant encrypted with said second shared secret key.

12. The method of claim 11, further comprising:

receiving a fifth message from said first participant in response to said sending said fourth message, said fifth message including said second authenticator for said first participant, a third authenticator for said second participant and a hash value of a third authenticator for said first participant encrypted with a third shared secret key, said fifth message including a third public value for said first participant; and sending a sixth message to said first participant in response to said receiving said fifth message, said sixth message including said third authenticator for said second participant and a third public value for said second participant encrypted with said third shared secret key.

13. The method of claim 12 wherein each of said authenticators is a random number;

each of said hash value of said first authenticator for said first participant, said hash value of said second authenticator for said first participant, and said hash value of said third authenticator for said first participant are created using a cryptographic hash function; and each of said first master key and said second master key are formed by encrypting at least part of a user password to obtain an encrypted password and inputting said encrypted password into said cryptographic hash function.

14. The method of claim 13 wherein said cryptographic hash function is SHA-1.

15. The method of claim 12 wherein said first message, said third message and said fifth message include an identifier for said first participant; and said second message, said fourth message and said sixth message include an identifier for said second participant.

16. The method of claim 15 wherein said identifier for said first participant comprises an IP address; and said identifier for said second participant comprises an IP address.

17. The method of claim 11 wherein said first public value for said first participant, said second public value for said first participant, said first public value for said second participant, said second public value for said second participant, and said private value for said second participant are Diffie-Hellman ephemeral parameters.

18. The method of claim 11 wherein said first public value for said first participant, said second public value for said first participant, said first public value for said second participant, said second public value for said second participant, and said private value for said second participant are Diffie-Hellman elliptic curve parameters.

19. The method of claim 12, further comprising:

decrypting said first message by using said first shared secret key;

decrypting said third message by using said second shared secret key; and decrypting said fifth message by using said third shared secret key.

20. A program storage device readable by a machine, tangibly embodying a program of instructions executable by the machine to perform a method for establishing a shared secret between a first participant and a second participant, the first participant and second participant sharing a password-based first master key and a hash function, the method for said first participant comprising:

sending a first message including a private value for said second participant and a first authenticator for said second participant encrypted with said first master key, said first message including a hash value of a first authenticator for said first participant encrypted with a first shared secret key, said first message including a first public value for said first participant;

receiving a second message in response to said sending said first message, said second message including said first authenticator for said second participant and a first public value for said second participant encrypted with said first shared secret key;

sending a third message in response to said receiving said second message, said third message including said first authenticator for said first participant, a hash value of a second authenticator for said first participant, a second authenticator for said second participant and a second master key encrypted with a second shared secret key, said third message including a second public value for said first participant; and receiving a fourth message in response to said sending said third message, said fourth message including a second authenticator for said second participant and a second public value for said second participant encrypted with said second shared secret key.

21. The program storage device of claim 20, said method further comprising:

sending a fifth message to said second participant in response to said receiving said fourth message, said fifth message including said second authenticator for said first participant, a third authenticator for said second participant and a hash value of a third authenticator for said first participant encrypted with a third shared secret key, said fifth message including a third public value for said first participant; and receiving a sixth message from said second participant in response to said sending said fifth message, said sixth message including said third authenticator for said second participant and a third public value for said second participant encrypted with said third shared secret key.

22. The program storage device of claim 21 wherein each of said authenticators is a random number;

each of said hash value of said first authenticator for said first participant, said hash value of said second authenticator for said first participant, and said hash value of said third authenticator for said first participant are created using a cryptographic hash function; and each of said first master key and said second master key are formed by encrypting at least part of a user password to obtain an encrypted password and inputting said encrypted password into said cryptographic hash function.

23. The program storage device of claim 22 wherein said cryptographic hash function is SHA-1.

24. The program storage device of claim 22 wherein said first message, said third message and said fifth message include an identifier for said first participant; and said second message, said fourth message and said sixth message include an identifier for said second participant.

25. The program storage device of claim 24 wherein said identifier for said first participant comprises an IP address; and said identifier for said second participant comprises an IP address.

26. The program storage device of claim 20 wherein said first public value for said first participant, said second public value for said first participant, said first public value for said second participant, said second public value for said second participant, and said private value for said second participant are Diffie-Hellman ephemeral parameters.

27. The program storage device of claim 20 wherein said first public value for said first participant, said second public value for said first participant, said first public value for said second participant, said second public value for said second participant, and said private value for said second participant are Diffie-Hellman elliptic curve parameters.

28. The program storage device of claim 26, said method further comprising:

authenticating said second message by comparing a stored value of said first authenticator for said second participant with the value of said first authenticator of said second participant in said second message;

authenticating said fourth message by comparing a stored value of said second authenticator for said second participant with the value of said second authenticator of said second participant in said fourth message; and authenticating said sixth message by comparing a stored third authenticator for said second participant with the value of said third authenticator of said second participant in said sixth message.

29. The program storage device of claim 28, said method further comprising:

decrypting said second message by using said first shared secret key;

decrypting said fourth message by using said second shared secret key; and decrypting said sixth message by using said third shared secret key.

30. An apparatus for establishing a shared secret between a first participant and a second participant, the first participant and second participant sharing a password-based first master key and a hash function, the apparatus comprising:

at least one memory having program instructions; and at least one processor operatively coupled to said first participant and configured to use the program instructions to:

send a first message including a private value for said second participant and a first authenticator for said second participant encrypted with said first master key, said first message including a hash value of a first authenticator for said first participant encrypted with a first shared secret key, said first message including a first public value for said first participant;

receive a second message in response to said sending said first message, said second message including said first authenticator for said second participant and a first public value for said second participant encrypted with said first shared secret key;

send a third message in response to said receiving said second message, said third message including said first authenticator for said first participant, a hash value of a second authenticator for said first participant, a second authenticator for said second participant and a second master key encrypted with a second shared secret key, said third message including a second public value for said first participant; and receive a fourth message in response to said sending said third message, said fourth message including a second authenticator for said second participant and a second public value for said second participant encrypted with said second shared secret key.

31. The apparatus of claim 30, wherein said at least one processor is further configured to use said program instructions to:

send a fifth message to said second participant in response to said receiving said fourth message, said fifth message including said second authenticator for said first participant, a third authenticator for said second participant and a hash value of a third authenticator for said first participant encrypted with a third shared secret key, said fifth message including a third public value for said first participant; and receive a sixth message from said second participant in response to said sending said fifth message, said sixth message including said third authenticator for said second participant and a third public value for said second participant encrypted with said third shared secret key.

32. An apparatus for establishing a shared secret between a first participant and a second participant, the first participant and second participant sharing a password-based first master key and a hash function, the apparatus comprising:

at least one memory having program instructions; and at least one processor operatively coupled to said second participant and configured to use the program instructions to:

receive a first message including a private value for said second participant and a first authenticator for said second participant encrypted with said first master key, said first message including a hash of a first authenticator for said first participant encrypted with a first shared secret key, said first message including a first public value for said first participant;

send a second message in response to said receiving said first message, said second message including said first authenticator for said second participant and a first public value for said second participant encrypted with said first shared secret key;

receive a third message in response to said sending said second message, said third message including said first authenticator for said first participant, a hash value of a second authenticator for said first participant, a second authenticator for said second participant and a second master key encrypted with a second shared secret key, said third message including a second public value for said first participant; and send a fourth message in response to said receiving said third message, said fourth message including a second authenticator for said second participant and a second public value for said second participant encrypted with said second shared secret key.

33. The apparatus of claim 32, wherein said at least one processor is further configured to use said program instructions to:

receive a fifth message from said first participant in response to said sending said fourth message, said fifth message including said second authenticator for said first participant, a third authenticator for said second participant and a hash value of a third authenticator for said first participant encrypted with a third shared secret key, said fifth message including a third public value for said first participant; and send a sixth message to said first participant in response to said receiving said fifth message, said sixth message including said third authenticator for said second participant and a third public value for said second participant encrypted with said third shared secret key.

34. An apparatus for establishing a shared secret between a first participant and a second participant, the first participant and second participant sharing a password-based first master key and a hash function, the apparatus operatively coupled to said first participant and comprising:

means for sending a first message including a private value for said second participant and a first authenticator for said second participant encrypted with said first master key, said first message including a hash value of a first authenticator for said first participant encrypted with a first shared secret key, said first message including a first public value for said first participant;

means for receiving a second message in response to said sending said first message, said second message including said first authenticator for said second participant and a first public value for said second participant encrypted with said first shared secret key;

means for sending a third message in response to said receiving said second message, said third message including said first authenticator for said first participant, a hash value of a second authenticator for said first participant, a second authenticator for said second participant and a second master key encrypted with a second shared secret key, said third message including a second public value for said first participant; and means for receiving a fourth message in response to said sending said third message, said fourth message including a second authenticator for said second participant and a second public value for said second participant encrypted with said second shared secret key.

35. The apparatus of claim 34, further comprising:

means for sending a fifth message to said second participant in response to said receiving said fourth message, said fifth message including said second authenticator for said first participant, a third authenticator for said second participant and a hash value of a third authenticator for said first participant encrypted with a third shared secret key, said fifth message including a third public value for said first participant; and means for receiving a sixth message from said second participant in response to said sending said fifth message, said sixth message including said third authenticator for said second participant and a third public value for said second participant encrypted with said third shared secret key.

36. An apparatus for establishing a shared secret between a first participant and a second participant, the first participant and second participant sharing a password-based first master key and a hash function, the apparatus operatively coupled to said second participant and comprising:

means for receiving a first message including a private value for said second participant and a first authenticator for said second participant encrypted with said first master key, said first message including a hash value of a first authenticator for said first participant encrypted with a first shared secret key, said first message including a first public value for said first participant;

means for sending a second message in response to said receiving said first message, said second message including said first authenticator for said second participant and a first public value for said second participant encrypted with said first shared secret key;

means for receiving a third message in response to said sending said second message, said third message including said first authenticator for said first participant, a hash value of a second authenticator for said first participant, a second authenticator for said second participant and a second master key encrypted with a second shared secret key, said third message including a second public value for said first participant; and means for sending a fourth message in response to said receiving said third message, said fourth message including a second authenticator for said second participant and a second public value for said second participant encrypted with said second shared secret key.

37. The apparatus of claim 36, further comprising:

means for receiving a fifth message from said first participant in response to said sending said fourth message, said fifth message including said second authenticator for said first participant, a third authenticator for said second participant and a hash value of a third authenticator for said first participant encrypted with a third shared secret key, said fifth message including a third public value for said first participant; and means for sending a sixth message to said first participant in response to said receiving said fifth message, said sixth message including said third authenticator for said second participant and a third public value for said second participant encrypted with said third shared secret key.

38. A program storage device readable by a machine, tangibly embodying a program of instructions executable by the machine to perform a method for establishing a shared secret between a first participant and a second participant, the first participant and second participant sharing a password-based first master key and a hash function, the method for said second participant comprising:

receiving a first message including a private value for said second participant and a first authenticator for said second participant encrypted with said first master key, said first message including a hash value of a first authenticator for said first participant encrypted with a first shared secret key, said first message including a first public value for said first participant;

sending a second message in response to said receiving said first message, said second message including said first authenticator for said second participant and a first public value for said second participant encrypted with said first shared secret key;

receiving a third message in response to said sending said second message, said third message including said first authenticator for said first participant, a hash value of a second authenticator for said first participant, a second authenticator for said second participant and a second master key encrypted with a second shared secret key, said third message including a second public value for said first participant; and sending a fourth message in response to said receiving said third message, said fourth message including a second authenticator for said second participant and a second public value for said second participant encrypted with said second shared secret key.

39. The program storage device of claim 38, said method further comprising:

receiving a fifth message from said first participant in response to said sending said fourth message, said fifth message including said second authenticator for said first participant, a third authenticator for said second participant and a hash value of a third authenticator for said first participant encrypted with a third shared secret key, said fifth message including a third public value for said first participant; and sending a sixth message to said first participant in response to said receiving said fifth message, said sixth message including said third authenticator for said second participant and a third public value for said second participant encrypted with said third shared secret key.

40. The program storage device of claim 39 wherein each of said authenticators is a random number;

each of said hash value of said first authenticator for said first participant, said hash value of said second authenticator for said first participant, and said hash value of said third authenticator for said first participant are created using a cryptographic hash function; and each of said first master key and said second master key are formed by encrypting at least part of a user password to obtain an encrypted password and inputting said encrypted password into said cryptographic hash function.

41. The program storage device of claim 40 wherein said cryptographic hash function is SHA-1.

42. The program storage device of claim 39 wherein said first message, said third message and said fifth message include an identifier for said first participant; and said second message, said fourth message and said sixth message include an identifier for said second participant.

43. The program storage device of claim 42 wherein said identifier for said first participant comprises an IP address; and said identifier for said second participant comprises an IP address.

44. The program storage device of claim 38 wherein said first public value for said first participant, said second public value for said first participant, said first public value for said second participant, said second public value for said second participant, and said private value for said second participant are Diffie-Hellman ephemeral parameters.

45. The program storage device of claim 38 wherein said first public value for said first participant, said second public value for said first participant, said first public value for said second participant, said second public value for said second participant, and said private value for said second participant are Diffie-Hellman elliptic curve parameters.

46. The program storage device of claim 39, said program storage device further comprising:

decrypting said first message by using said first shared secret key;

decrypting said third message by using said second shared secret key; and decrypting said fifth message by using said third shared secret key.

47. The apparatus of claim 31 wherein each of said authenticators is a random number;

each of said hash value of said first authenticator for said first participant, said hash value of said second authenticator for said first participant, and said hash value of said third authenticator for said first participant are created using a cryptographic hash function; and each of said first master key and said second master key are formed by encrypting at least part of a user password to obtain an encrypted password and inputting said encrypted password into said cryptographic hash function.

48. The apparatus of claim 47 wherein said cryptographic hash function is SHA-1.

49. The apparatus of claim 31 wherein said first message, said third message and said fifth message include an identifier for said first participant; and said second message, said fourth message and said sixth message include an identifier for said second participant.

50. The apparatus of claim 49 wherein said identifier for said first participant comprises an IP address; and said identifier for said second participant comprises an IP address.

51. The apparatus of claim 30 wherein said first public value for said first participant, said second public value for said first participant, said first public value for said second participant, said second public value for said second participant, and said private value for said second participant are Diffie-Hellman ephemeral parameters.

52. The apparatus of claim 30 wherein said first public value for said first participant, said second public value for said first participant, said first public value for said second participant, said second public value for said second participant, and said private value for said second participant are Diffie-Hellman elliptic curve parameters.

53. The apparatus of claim 31 wherein said apparatus is further configured to:
   authenticate said second message by comparing a stored value of said first authenticator for said second participant with the value of said first authenticator of said second participant in said second message;
   authenticate said fourth message by comparing a stored value of said second authenticator for said second participant with the value of said second authenticator of said second participant in said fourth message; and
   authenticate said sixth message by comparing a stored third authenticator for said second participant with the value of said third authenticator of said second participant in said sixth message.

54. The apparatus of claim 31 wherein said apparatus is further configured to:
   decrypting said second message by using said first shared secret key;
   decrypting said fourth message by using said second shared secret key; and
   decrypting said sixth message by using said third shared secret key.

55. The apparatus of claim 33 wherein
   each of said authenticators is a random number;
   each of said hash value of said first authenticator for said first participant, said hash value of said second authenticator for said first participant, and said hash value of said third authenticator for said first participant are created using a cryptographic hash function; and
   each of said first master key and said second master key are formed by encrypting at least part of a user password to obtain an encrypted password and inputting said encrypted password into said cryptographic hash function.

56. The apparatus of claim 55 wherein said cryptographic hash function is SHA-1.

57. The apparatus of claim 33 wherein
   said first message, said third message and said fifth message include an identifier for said first participant; and
   said second message, said fourth message and said sixth message include an identifier for said second participant.

58. The apparatus of claim 57 wherein
   said identifier for said first participant comprises an IP address; and
   said identifier for said second participant comprises an IP address.

59. The apparatus of claim 32 wherein said first public value for said first participant, said second public value for said first participant, said first public value for said second participant, said second public value for said second participant, and said private value for said second participant are Diffie-Hellman ephemeral parameters.

60. The apparatus of claim 32 wherein said first public value for said first participant, said second public value for said first participant, said first public value for said second participant, said second public value for said second participant, and said private value for said second participant are Diffie-Hellman elliptic curve parameters.

61. The apparatus of claim 33 wherein said apparatus is further configured to:
   decrypting said first message by using said first shared secret key;
   decrypting said third message by using said second shared secret key; and
   decrypting said fifth message by using said third shared secret key.

62. The apparatus of claim 35 wherein
   each of said authenticators is a random number;
   each of said hash value of said first authenticator for said first participant, said hash value of said second authenticator for said first participant, and said hash value of said third authenticator for said first participant are created using a cryptographic hash function; and
   each of said first master key and said second master key are formed by encrypting at least part of a user password to obtain an encrypted password and inputting said encrypted password into said cryptographic hash function.

63. The apparatus of claim 62 wherein said cryptographic hash function is SHA-1.

64. The apparatus of claim 35 wherein
   said first message, said third message and said fifth message include an identifier for said first participant; and
   said second message, said fourth message and said sixth message include an identifier for said second participant.

65. The apparatus of claim 64 wherein
   said identifier for said first participant comprises an IP address; and
   said identifier for said second participant comprises an IP address.

66. The apparatus of claim 34 wherein said first public value for said first participant, said second public value for said first participant, said first public value for said second participant, said second public value for said second participant, and said private value for said second participant are Diffie-Hellman ephemeral parameters.

67. The apparatus of claim 34 wherein said first public value for said first participant, said second public value for said first participant, said first public value for said second participant, said second public value for said second participant, and said private value for said second participant are Diffie-Hellman elliptic curve parameters.

68. The apparatus of claim 35, further comprising:
   means for authenticate said second message by comparing a stored value of said first authenticator for said second participant with the value of said first authenticator of said second participant in said second message;
   means for authenticate said fourth message by comparing a stored value of said second authenticator for said second participant with the value of said second authenticator of said second participant in said fourth message; and
   means for authenticate said sixth message by comparing a stored third authenticator for said second participant with the value of said third authenticator of said second participant in said sixth message.

69. The apparatus of claim 35, further comprising:
   means for decrypting said second message by using said first shared secret key;
   means for decrypting said fourth message by using said second shared secret key; and
   means for decrypting said sixth message by using said third shared secret key.

70. The apparatus of claim 37 wherein
   each of said authenticators is a random number;
   each of said hash value of said first authenticator for said first participant, said hash value of said second authenticator for said first participant, and said hash value of said third said authenticator for said first participant are created using a cryptographic hash function; and each of said first master key and said second master key are formed by encrypting at least part of a user password to obtain an encrypted password and inputting said encrypted password into said cryptographic hash function.

71. The apparatus of claim 70 wherein said cryptographic hash function is SHA-1.

72. The apparatus of claim 37 wherein said first message, said third message and said fifth message include an identifier for said first participant; and said second message, said fourth message and said sixth message include an identifier for said second participant.

73. The apparatus of claim 72 wherein said identifier for said first participant comprises an IP address; and said identifier for said second participant comprises an IP address.

74. The apparatus of claim 36 wherein said first public value for said first participant, said second public value for said first participant, said first public value for said second participant, said second public value for said second participant, and said private value for said second participant are Diffie-Hellman ephemeral parameters.

75. The apparatus of claim 36 wherein said first public value for said first participant, said second public value for said first participant, said first public value for said second participant, said second public value for said second participant, and said private value for said second participant are Diffie-Hellman elliptic curve parameters.

76. The apparatus of claim 37, further comprising:

means for decrypting said first message by using said first shared secret key;

means for decrypting said third message by using said second shared secret key; and means for decrypting said fifth message by using said third shared secret key.

77. A method for a first participant to establish a shared secret with a second participant, said first participant and said second participant sharing a password-based first master key and a hash function, the method for said first participant comprising:

sending a first message including a private value for said second participant and a first authenticator for said second participant encrypted with said first master key, said first message including a hash value of a first authenticator for said first participant encrypted with a first shared secret key, said first message including a first public value for said first participant;

receiving a second message in response to said sending said first message, said second message including said first authenticator for said second participant and a first public value for said second participant encrypted with said first shared secret key;

sending a third message in response to said receiving said second message, said third message including said first authenticator for said first participant, a hash value of a second authenticator for said first participant, a second authenticator for said second participant and a second master key encrypted with a second shared secret key, said third message including a second public value for said first participant;

receiving a fourth message in response to said sending said third message, said fourth message including a second authenticator for said second participant and a second public value for said second participant encrypted with said second shared secret key;

sending a fifth message to said second participant in response to said receiving said fourth message, said fifth message including said second authenticator for said first participant, a third authenticator for said second participant and a hash value of a third authenticator for said first participant encrypted with a third shared secret key, said fifth message including a third public value for said first participant; and receiving a sixth message from said second participant in response to said sending said fifth message, said sixth message including said third authenticator for said second participant and a third public value for said second participant encrypted with said third shared secret key, each of said authenticators comprising a random number, each of said hash value of said first authenticator for said first participant, said hash value of said second authenticator for said first participant, and said hash value of said third authenticator for said first participant created using a cryptographic hash function, each of said first master key and said second master key formed by encrypting at least part of a user password to obtain an encrypted password and inputting said encrypted password into said cryptographic hash function.

78. The method of claim 77 wherein said cryptographic hash function is SHA-1.

79. The method of claim 77 wherein said first message, said third message and said fifth message include an identifier for said first participant; and said second message, said fourth message and said sixth message include an identifier for said second participant.

80. The method of claim 79 wherein said identifier for said first participant comprises an IP address; and said identifier for said second participant comprises an IP address.

81. The method of claim 77 wherein said first public value for said first participant, said second public value for said first participant, said first public value for said second participant, said second public value for said second participant, and said private value for said second participant are Diffie-Hellman ephemeral parameters; and said method further comprises:

authenticating said second message by comparing a stored value of said first authenticator for said second participant with the value of said first authenticator of said second participant in said second message;

authenticating said fourth message by comparing a stored value of said second authenticator for said second participant with the value of said second authenticator of said second participant in said fourth message; and authenticating said sixth message by comparing a stored third authenticator for said second participant with the value of said third authenticator of said second participant in said sixth message.

82. A method for a first participant to establish a shared secret with a second participant, said first participant and said second participant sharing a password-based first master key and a hash function, the method for said second participant comprising:

receiving a first message including a private value for said second participant and a first authenticator for said second participant encrypted with said first master key, said first message including a hash value of a first authenticator for said first participant encrypted with a first shared secret key, said first message including a first public value for said first participant;

sending a second message in response to said receiving said first message, said second message including said first authenticator for said second participant and a first public value for said second participant encrypted with said first shared secret key;

receiving a third message in response to said sending said second message, said third message including said first authenticator for said first participant, a hash value of a second authenticator for said first participant, a second authenticator for said second participant and a second master key encrypted with a second shared secret key, said third message including a second public value for said first participant;

sending a fourth message in response to said receiving said third message, said fourth message including a second authenticator for said second participant and a second public value for said second participant encrypted with said second shared secret key;

receiving a fifth message from said first participant in response to said sending said fourth message, said fifth message including said second authenticator for said first participant, a third authenticator for said second participant and a hash value of a third authenticator for said first participant encrypted with a third shared secret key, said fifth message including a third public value for said first participant; and     sending a sixth message to said first participant in response to said receiving said fifth message, said sixth message including said third authenticator for said second participant and a third public value for said second participant encrypted with said third shared secret key, each of said authenticators comprising a random number, each of said hash value of said first authenticator for said first participant, said hash value of said second authenticator for said first participant, and said hash value of said third authenticator for said first participant created using a cryptographic hash function, each of said first master key and said second master key formed by encrypting at least part of a user password to obtain an encrypted password and inputting said encrypted password into said cryptographic hash function.

83. The method of claim 82 wherein said cryptographic hash function is SHA-1.

84. The method of claim 82 wherein said first message, said third message and said fifth message include an identifier for said first participant; and     said second message, said fourth message and said sixth message include an identifier for said second participant.

85. The method of claim 84 wherein said identifier for said first participant comprises an IP address; and     said identifier for said second participant comprises an IP address.

86. A program storage device readable by a machine, tangibly embodying a program of instructions executable by the machine to perform a method for establishing a shared secret between a first participant and a second participant, the first participant and second participant sharing a password-based first master key and a hash function, the method for said first participant comprising:

sending a first message including a private value for said second participant and a first authenticator for said second participant encrypted with said first master key, said first message including a hash value of a first authenticator for said first participant encrypted with a first shared secret key, said first message including a first public value for said first participant;

receiving a second message in response to said sending said first message, said second message including said first authenticator for said second participant and a first public value for said second participant encrypted with said first shared secret key;

sending a third message in response to said receiving said second message, said third message including said first authenticator for said first participant, a hash value of a second authenticator for said first participant, a second authenticator for said second participant and a second master key encrypted with a second shared secret key, said third message including a second public value for said first participant;

receiving a fourth message in response to said sending said third message, said fourth message including a second authenticator for said second participant and a second public value for said second participant encrypted with said second shared secret key;

sending a fifth message to said second participant in response to said receiving said fourth message, said fifth message including said second authenticator for said first participant, a third authenticator for said second participant and a hash value of a third authenticator for said first participant encrypted with a third shared secret key, said fifth message including a third public value for said first participant; and     receiving a sixth message from said second participant in response to said sending said fifth message, said sixth message including said third authenticator for said second participant and a third public value for said second participant encrypted with said third shared secret key, each of said authenticators comprising a random number, each of said hash value of said first authenticator for said first participant, said hash value of said second authenticator for said first participant, and said hash value of said third authenticator for said first participant are created using a cryptographic hash function, each of said first master key and said second master key formed by encrypting at least part of a user password to obtain an encrypted password and inputting said encrypted password into said cryptographic hash function.

87. The program storage device of claim 86 wherein said cryptographic hash function is SHA-1.

88. The program storage device of claim 86 wherein said first message, said third message and said fifth message include an identifier for said first participant; and     said second message, said fourth message and said sixth message include an identifier for said second participant.

89. The program storage device of claim 88 wherein said identifier for said first participant comprises an IP address; and said identifier for said second participant comprises an IP address.

90. The program storage device of claim 86 wherein said first public value for said first participant, said second public value for said first participant, said first public value for said second participant, said second public value for said second participant, and said private value for said second participant are Diffie-Hellman ephemeral parameters.

91. The program storage device of claim 86 wherein said first public value for said first participant, said second public value for said first participant, said first public value for said second participant, said second public value for said second participant, and said private value for said second participant are Diffie-Hellman elliptic curve parameters.

92. The program storage device of claim 90, said method further comprising:

authenticating said second message by comparing a stored value of said first authenticator for said second participant with the value of said first authenticator of said second participant in said second message;

authenticating said fourth message by comparing a stored value of said second authenticator for said second participant with the value of said second authenticator of said second participant in said fourth message; and authenticating said sixth message by comparing a stored third authenticator for said second participant with the value of said third authenticator of said second participant in said sixth message.

93. The program storage device of claim 91, said method further comprising:

decrypting said second message by using said first shared secret key;

decrypting said fourth message by using said second shared secret key; and decrypting said sixth message by using said third shared secret key.

* * * * *

UNITED STATES PATENT AND TRADEMARK OFFICE
CERTIFICATE OF CORRECTION

PATENT NO. : 6,718,467 B1
DATED : April 6, 2004
INVENTOR(S) : Jonathan T. Trostle It is certified that error appears in the above-identified patent and that said Letters Patent is hereby corrected as shown below:

Column 5,
Line 37, replace "Cid, [y$_1$, s]K, [h(c)]DHkey$_1$,X$_1$" with -- Cid, [y$_1$, s]K, [h( c)]DHkey$_1$,X$_1$ --.
Line 56, replace "Sid, [s, Y$_2$]DHkey$_1$" with -- Sid, [s, Y$_2$]DHkey$_1$ --.

Column 6,
Line 18, replace "Cid, [c, s$'$, h(c'), h(k(P'))]DHkey$_2$, X$_2$" with -- Cid, [c, s', h(c'), h(k(P'))]DHkey$_2$, X$_2$ --.
Line 33, replace "Sid, [s$'$ Y$_3$]DHkey$_2$" with -- Sid, [s', Y$_3$]DHkey$_2$ --.
Line 50, replace " Cid, (c',h(c"), s"]DHkey$_3$, X$_3$" with -- Cid, [c',h(c"), s"]DHkey$_3$, X$_3$ --.
Line 62, replace "Sid, s", Y$_4$]DHkey$_3$" with -- Sid, s", Y$_4$]DHkey$_3$ --.

Column 17,
Lines 17, 19, 21, 64 and 66, replace "decrypting" with -- decrypt --.

Column 18,
Line 1, replace "decrypting" with -- decrypt --.
Lines 43, 47 and 52, replace "authenticate" with -- authenticating --.

Signed and Sealed this

Twenty-eighth Day of December, 2004

JON W. DUDAS
*Director of the United States Patent and Trademark Office*